May 19, 1936. R. C. PERSONS 2,041,018
ELECTRIC SOLDERING IRON
Filed April 25, 1934
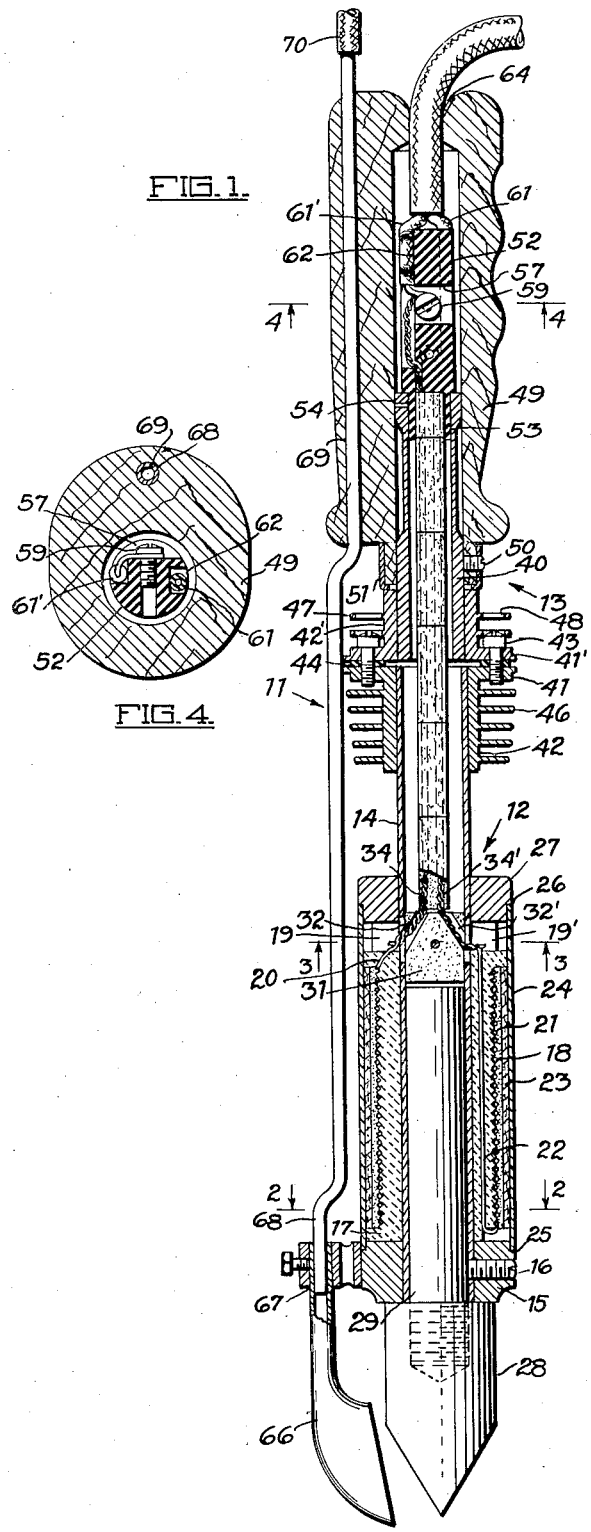
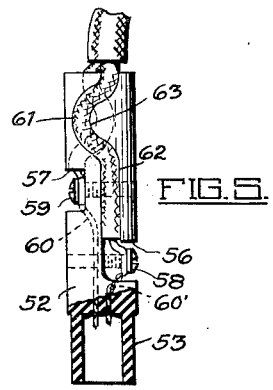
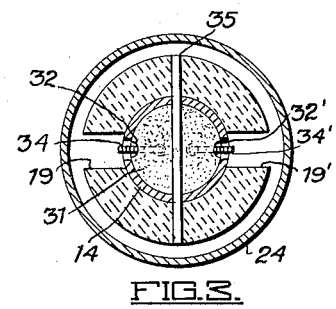
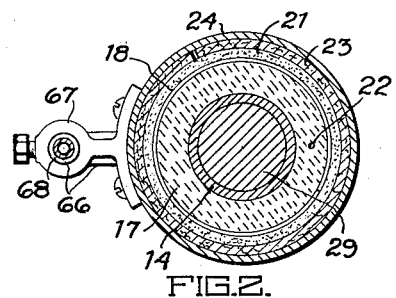
INVENTOR
RALPH C. PERSONS
BY
ATTORNEY Patented May 19, 1936

2,041,018

UNITED STATES PATENT OFFICE 2,041,018

ELECTRIC SOLDERING IRON

Ralph C. Persons, Los Angeles, Calif.

Application April 25, 1934, Serial No. 722,297

8 Claims. (Cl. 219—26)

This invention has to do in a general way with instruments for the melting and application of solder, generally known in the art as soldering irons.

The invention is more particularly related to improvements in devices of the class described which are of the so-called electrical type wherein the tip is heated by means of an electrical heating element. Inasmuch as the so-called electric soldering iron is sometimes used over relatively long intervals without disconnecting the source of current, it frequently happens that the grip portion of the iron becomes so hot that it is uncomfortable to handle, and in some instances the grip may be burned. It therefore becomes a primary object of this invention to provide a device of the class described with means for preventing undue heating of the grip by heat conducted rearwardly from the heating element.

It is a further object of this invention to provide a device of the class described with means for conducting toxic fumes away from the tip portion during the use of the device.

It is still a further feature of the device contemplated by this invention to provide a heating element and a tip constructed so as to maintain the tip at substantially uniform temperature during use and to reduce heat loss to a minimum.

It is a still further object of this invention to produce a device of the class described which is of rugged construction and in which the conductors comprising the electric circuit are arranged and constructed in a manner which will facilitate the assembly and the repair of the unit and at the same time reduce to a minimum the liability of short circuits resulting from rough handling.

The details in the construction of a preferred form of my invention, together with other objects attending its production, will be best understood from the following description of the accompanying drawing which is chosen for illustrative purposes only, and in which—

Fig. 1 is a sectional elevation showing a preferred form of my invention;

Fig. 2 is a plan section taken in the plane represented by the line 2—2 of Fig. 1;

Fig. 3 is an inverted plan section taken in the plane represented by the line 3—3 of Fig. 1;

Fig. 4 is an inverted plan section taken in a plane represented by the line 4—4 of Fig. 1; and Fig. 5 is an elevational view partly broken away showing a preferred form of terminal block contemplated by my invention.

For convenience in assembly and as an aid in preventing the conduction of heat from the tip to the grip portion, I propose to construct the soldering iron 11 in two sections which I may term a tip or heating-element section 12 and a handle section 13.

The tip section 12 is composed of a rigid tube of heat conductive metal indicated by reference numeral 14, such tube having on its outer end a collar member 15 which is also of heat-conductive metal and is secured to the tube by means of a set screw 16.

Mounted on the tube behind the collar 15 is a spool 17 of refractory material such as "Lavite". This material has the property of retaining heat and constitutes what I may term a resistor support. The outer surface of the spool is corrugated or threaded to receive a winding of a resistance conductor indicated by reference numeral 18.

It will be observed that the inner end of the spool is provided with notches 19 and 19', the notch 19 being associated with an aperture 20 through the flange of the spool and through which the resistance conductor 18 passes. This conductor is then wound about the spool 17 to its other end and the return lead is brought back to the notch 19 through a longitudinal passage 22 in the wall of the spool 17.

The resistance winding is covered with a refractory cement 21 which is in turn encased with a sheath of insulating material such as asbestos 23. This entire heating element is encased with a metal sleeve 24 one end of which engages a shoulder 25 formed on the collar 15, the other end being engaged with a similar shoulder 26 formed on a collar 27 which is pressed or otherwise suitably secured to the tube 14.

Reference numeral 28 indicates a tip which may be composed of any conductive material, perferably copper, such tip being mounted on or otherwise attached to a stem 29 which extends into that portion of the tube 14 which is surrounded by the heating element. The stem and tip are secured in place by means of a set screw 16 which extends through an aperture in the tube into pressure engagement with the stem.

Reference numeral 31 indicates a head of insulating and preferably refractory material which is mounted in the tube above the inner end of the tip and adjacent the notches 19 and 19' in the refractory spool 17. This bead is provided with a pair of inclined passages 32 and 32' which are situated opposite openings in the wall of the tube 14 for carrying conductors 34 and 34' into the tube 14. The bead or button 31 and the refractory spool 17 are locked together by a pin 35.

The conductors 34 and 34' may be composed of a material of low resistance such as copper which is secured to the resistance conductor on the spool, or they may be composed of the same material as the resistance conductor, in which case it is preferable to use two or more lengths of the material twisted together to increase the cross-sectional area and thereby reduce the resistance. This is the form which I have chosen to illustrate the invention.

The leads 34 and 34' extend through insulating beads of any conventional type which are positioned in the rigid conduit constituting both the tip and handle sections of the device.

The handle section 13 embodies a rigid tube 40 which is in coaxial alignment with the tube 14, and these two tubes at their adjacent ends are provided with flanges 41 and 41'. These flanges constitute heat-radiating fins and they may be formed integrally on the respective tubes, but they preferably constitute parts of heat-radiating collars 42 and 42' which are formed of material of high conductivity such as aluminum and are pressed or otherwise secured to their respective supporting tubes. The flanges 41 and 41' are suitably drilled and tapped for the reception of screws 43, and to reduce the heat conduction between the two flanges to a minimum I provide spacing washers 44 about the screws, such washers being composed of a material of relative low conductivity such as bakelite or possibly iron.

In addition to the flanges 41 and 41', I provide the collars 42 and 42' with a plurality of radiating fins generally indicated by reference numerals 46 and 47, the fins 47 being drilled as indicated at 48 to permit the installation of screws.

Reference numeral 49 indicates a hollow grip which is secured to the tubular section 40 by means of a set screw 50 extending through a projecting collet 51 on the grip.

Reference numeral 52 indicates a terminal block which has a hollow projection 53 extending into the top of the tube 40 and secured therein by means of a pin 54. This projection receives the topmost bead containing the conductors 34 and 34' and as is conventional practice must be composed of an insulating material such as bakelite.

The terminal block is of a size such that it can be conveniently received in the hollow grip and is provided with notches 56 and 57 which receive terminal screws 58 and 59. These notches communicate with passages 60 and 60' through the block which carries resistance conductor leads to the terminal screws. Current is supplied to the terminal screws by which I may term energizing conductors 61 and 61' which are carried in grooves 62 in the periphery of the block, such screws being formed with bends or loops 63 for the purpose of preventing undue strain on the terminal screws. The energizing conductors are mounted in an insulating cable which extends through an opening in the end of the handle as indicated at 64.

For the purpose of carrying away the fumes which are generated during a soldering operation, I provide the device contemplated by this invention with a small hood 66, the mouth of which is positioned above the tip, such hood being adjustably mounted in the clamp generally indicated at 67 where it receives the end of a suction pipe 68. This suction pipe, which is preferably formed rigidly with the unit, extends upwardly through a passage 69 in the grip 49, the upper end of such tube being adapted for connection with a flexible conduit 70 which leads to a vacuum pump.

It is to be understood that, while I have herein described and illustrated one preferred form of my invention, the invention is not limited to the precise construction described, but includes within its scope whatever changes fairly come within the spirit of the appended claims.

I claim as my invention:

1. A soldering iron of the class described embodying the combination of: a heating element; a tip mounted in said heating element; a handle attached to said heating element; a hood adjustably mounted on said iron with its mouth above said tip; and a suction tube connected with said hood.

2. A soldering iron of the class described embodying the combination of: a heating element; a tip mounted in said heating element; a handle attached to said heating element; a hood adjustably mounted on said iron with its mouth above said tip; and a suction tube connection with said hood and extending through said handle.

3. A soldering iron of the class described embodying; a tubular tip section; a tubular handle section; flanges on the adjacent ends of said sections; screws in said flanges securing said sections together; a heat conductive collar secured to the tip end of said tip section; a refractory spool mounted on said tip section behind said collar; a tip member secured in the portion of said tip section surrounded by said spool; an insulating bead in said tip section behind said spool; a pin extending through said spool, said tip section and said bead; a resistance conductor surrounding said spool; conductors extending from said resistance winding through notches in said spool and through openings in said bead into said tubular tip section; a grip mounted on said handle section; and conductors extending through said grip for delivering current to said resistance conductors.

4. A soldering iron of the class described embodying: a tubular tip section; a tubular handle section; flanges on the adjacent ends of said sections; screws in said flanges securing said sections together; spacing means surrounding said screws between said flanges; a heat conductive collar secured to the tip end of said tip section; a refractory spool mounted on said tip section behind said collar; a tip member secured in the portion of said tip section surrounded by said spool; an insulating bead in said tip section behind said spool; a pin extending through said spool, said tip section and said bead; a resistance conductor surrounding said spool; conductors extending from said resistance winding through notches in said spool and through openings in said bead into said tubular tip section; a grip mounted on said handle section; and conductors extending through said grip for delivering current to said resistance conductors.

5. A soldering iron of the class described embodying: a tubular tip section; a tubular handle section; flanges on the adjacent ends of said sections; screws in said flanges securing said sections together; a heat conductive collar secured to the tip end of said tip section; a refractory spool mounted on said tip section behind said collar; a tip member secured in the portion of said tip section surrounded by said spool; a heat conductive shell surrounding said spool and engaging said collar; an insulating bead in said tip section behind said spool; a pin extending through said spool, said tip section and said bead; a resistance conductor surrounding said spool; conductors extending from said resistance winding through notches in said spool and through openings in said bead into said tubular tip section; a grip mounted on said handle section; and conductors extending through said grip for delivering current to said resistance conductors.

6. A soldering iron of the class described embodying: a tubular tip section; a tubular handle section; flanges on the adjacent ends of said sections; screws in said flanges securing said sections together; a heat conductive collar secured to the tip end of said tip section; a refractory spool mounted on said tip section behind said collar; a tip member secured in the portion of said tip section surrounded by said spool; an insulating bead in said tip section behind said spool; a pin extending through said spool, said tip section and said bead; a resistance conductor surrounding said spool; conductors extending from said resistance winding through notches in said spool and through openings in said bead into said tubular tip section; a grip mounted on said handle section; a terminal block in said grip, said terminal block having a projection secured in the end of said handle section; binding posts on said terminal block for engaging conductors from said resistance conductors; and lead wires secured to said binding posts and extending from said handle.

7. A soldering iron of the class described embodying: a tubular tip section; a tubular handle section; flanges on the adjacent ends of said sections; screws in said flanges securing said sections together; a heat conductive collar secured to the tip end of said tip section; a refractory spool mounted on said tip section behind said collar; a tip member secured in the portion of said tip section surrounded by said spool; an insulating bead in said tip section behind said spool; a pin extending through said spool, said tip section and said bead; a resistance conductor surrounding said spool; conductors extending from said resistance winding through notches in said spool and through openings in said bead into said tubular tip section, said spool having a longitudinal passage therethrough for the return of one end of said resistance conductor.

8. A soldering iron of the class described embodying: a tip section; a handle section; heat radiating flanges on the adjacent ends of said sections; screws securing said flanges together; spacing means between said flanges; and a plurality of heat radiating fins on each of said sections, one set of the last mentioned fins being provided with aligned openings to permit the passage of said screws.

RALPH C. PERSONS.